(12) United States Patent
Ziegs

(10) Patent No.: US 8,776,819 B2
(45) Date of Patent: Jul. 15, 2014

(54) VALVE FOR AERATING AND VENTILATING A TANK

(75) Inventor: Carsten Ziegs, Hamburg (DE)

(73) Assignee: Makita Corporation, Anjo-Shi (JP)

( * ) Notice: Subject to any disclaimer, the term of this patent is extended or adjusted under 35 U.S.C. 154(b) by 315 days.

(21) Appl. No.: 13/273,847

(22) Filed: Oct. 14, 2011

(65) Prior Publication Data

US 2012/0091159 A1 Apr. 19, 2012

(30) Foreign Application Priority Data

Oct. 15, 2010 (DE) ...................... 20 2010 014 283 U

(51) Int. Cl.
*B60K 15/035* (2006.01)

(52) U.S. Cl.
USPC .......................................................... 137/43

(58) Field of Classification Search
USPC ............................... 137/43, 45, 38
See application file for complete search history.

(56) References Cited

U.S. PATENT DOCUMENTS

| | | | |
|---|---|---|---|
| 2,457,800 A | * | 1/1949 | Allen ............................... 429/85 |
| 4,570,657 A | | 2/1986 | Rogers |
| 2006/0213553 A1 | * | 9/2006 | Mills et al. ....................... 137/43 |

FOREIGN PATENT DOCUMENTS

| | | |
|---|---|---|
| DE | 928 280 | 5/1955 |
| DE | 1 024 019 | 2/1958 |
| DE | 197 05 440 A1 | 9/1997 |
| DE | 200 13 293 U1 | 1/2002 |
| JP | A-2002-19477 | 1/2002 |

* cited by examiner

*Primary Examiner* — John K Fristoe, Jr.
*Assistant Examiner* — Kevin E Lynn
(74) *Attorney, Agent, or Firm* — Oliff PLC

(57) ABSTRACT

To create a valve for aerating and ventilating a tank comprising a closing element, which is fixed against a valve seat in a closed state so as to form a seal and which is lifted out of the valve seat in an open state, wherein provision is made for a blocking element, which can be moved by means of the force of gravity, by means of which the closing element can be fixed at least in the closed state, which overcomes the disadvantages of the state of the art, which ensures a reliable function even in response to a use under rough conditions with impact loads and which is designed in a simple manner, it is proposed for the blocking element to be accommodated on the closing element so as to be movable.

11 Claims, 1 Drawing Sheet

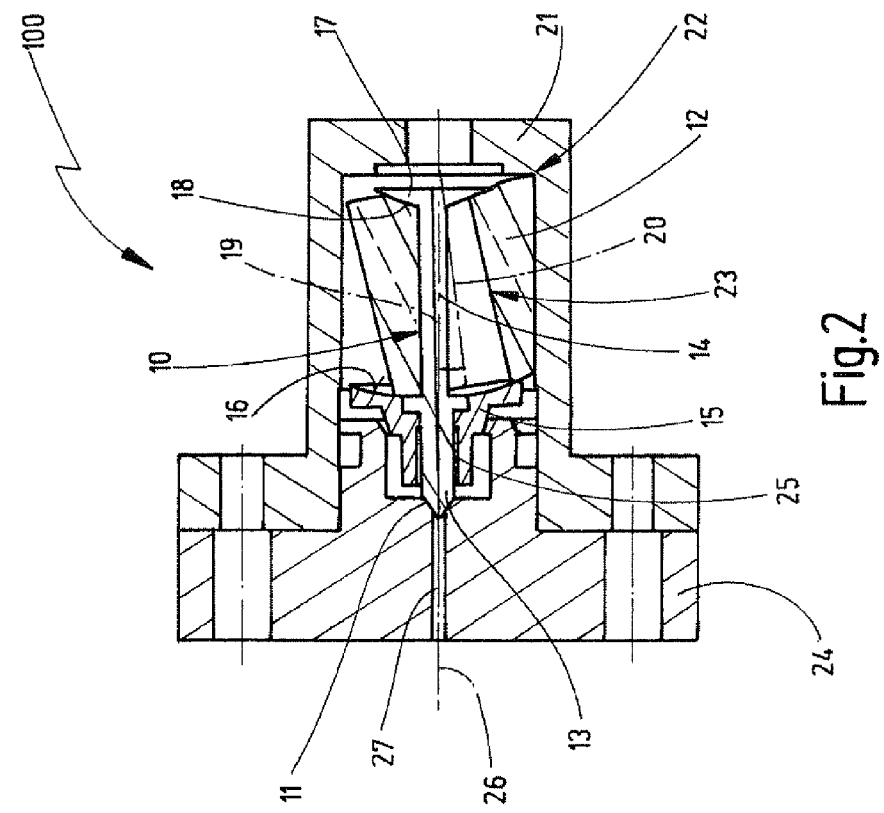
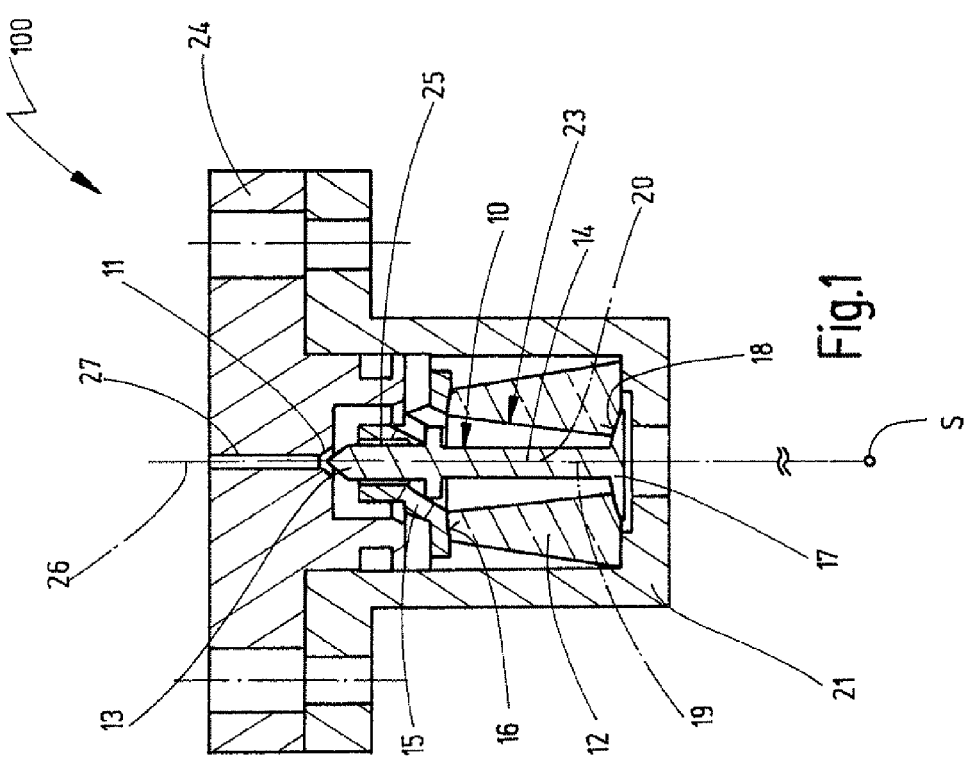

VALVE FOR AERATING AND VENTILATING A TANK

The instant invention relates to a valve for aerating and ventilating a tank comprising a closing element, which fits against a valve seat so as to form a seal in a closed state and which is lifted out of the valve seat in an open state, wherein provision is made for a blocking element, which can be moved by means of the force of gravity, by means of which the closing element can be fixed at least in the closed state.

Valves for aerating and ventilating a tank, in which the fuel for a motor of a workpiece is accommodated, are required, in particular when the tank can be tilted relative to the force of gravity in such a manner that fuel can leak out of a necessary aeration opening of the tank for the aeration and ventilation thereof. Such valves are used for tanks, which are provided for hand-held motor devices, such as an angle grinder or a saw, for example, or for equipment for garden and landscape maintenance, for example, which are hand-guided and which can consequently be tilted out of a neutral position, approximately by 90°.

However, an aeration and ventilation of the tank is required; for example, an under pressure can be created in the tank when fuel is sucked out of the tank via a fuel line. Furthermore, an overpressure can be created in the tank, for example when the tank and the fuel in the tank are heated, in particular by the start-up of the motor device, changes to the outside temperature or direct solar radiation. Consequently, the problem of an aeration and ventilation of the tank arises for the venting, wherein the valve must be embodied in such a manner that fuel cannot leak out of the tank when it is tilted out of its neutral position.

PRIOR ART

A valve for aerating and ventilating a tank comprising a closing element is known from DE 197 05 440 A1, in the case of which valve the closing element is embodied in a plate-like manner and encompasses a sealing element on the upper side, and a ventilating channel can be closed when the closing element comprising the sealing element is pressed against a valve seat. In the event that the closing element comprising the sealing element lifts from the valve seat again, the ventilating channel is released again. Consequently, the closing element can fit against the valve seat so as to form a seal in the closed state and can be lifted out of the valve seat in the open state, wherein provision is made for a blocking element in the form of a closing actuation ball, which can be moved by means of the force of gravity, by means of which the closing element can be fixed against the valve seat in the closed state. The actuating ball is guided on a cone-shaped support and when the actuating ball is deflected out of a center position due to the force of gravity, it wanders upwards along the cone of the support and thus moves the closing element, which borders on the actuating ball, against the valve seat.

A further valve is known from DE 200 13 293 U1, wherein a valve body can be fixed against a sealing surface so as to form a seal and wherein provision is made for a blocking element, again in the shape of a ball, which can be moved by means of the force of gravity. The change of position of the valve also changes the position of the ball-shaped blocking element, which is guided in a cone, and, due to the deflection of the ball-shaped blocking element, it moves upwards along the cone and presses the valve body against the sealing surface.

In the case of valves comprising a blocking element, which can be moved by means of the force of gravity, which is embodied as a ball and which runs in a cone surface, the disadvantage can arise that the blocking element can jam between the adjacent closing element and the element for forming the cone surface. Consequently, the closing element remains in the closed state, in that it is fixed against the valve seat. The deflection of the ball-shaped blocking element from the center position is not limited and in the event that an application of force is made on the ball, for example by means of an impact effect in deflection direction of the blocking element, the jamming can be initiated. The ball-shaped blocking element is preferably embodied from a steel material comprising a high density, so as to be able to effect a minimum closing force against the closing element. On the contrary, modification parts and in particular the closing element, can be embodied with a sealing ring made of plastic, which can be fixed in the valve seat so as to form a seal, and can thus form a resilience, so that this resilience can provide for a tensioning of the ball in the force closure chain, which prevents a returning of the ball into the open state.

Valves for aerating and ventilating tanks, which have a ball-shaped blocking element, further encompass an extensive production, because a plurality of individual parts is necessary and measures are required for positioning the freely movable blocking element between the cone surface body and the closing element in such a manner that a reliable function of the valve is ensured.

DESCRIPTION OF THE INVENTION

Object, Solution, Advantages

It is thus the object of the instant invention to create a valve for aerating and ventilating a tank, which overcomes the disadvantages of the afore-identified state of the art, which ensures a reliable function even in response to a use under rough conditions with impact loads and which is designed in a simple manner.

This object is solved, based on a valve for aerating and ventilating a tank according to the preamble of claim 1 in combination with the characterizing features. Advantageous further developments of the invention are specified in the dependent claims.

The invention includes the technical teaching that the blocking element is accommodated on the closing element so as to be movable.

The invention is thereby based on the idea of embodying the blocking element in such a manner that it is accommodated on the closing element so as to be movable. This results in an alternative, a solution, which is improved in function and reliability, for embodying the blocking element as a ball, which interacts with a cone surface. According to the invention, the blocking element is accommodated on the closing element in such a manner that the blocking element can fix the closing element in the closed state of the closing element as a function of the effective direction of the force of gravity. According to the usage of the words of the instant invention, the movable accommodation of the blocking element on the closing element also describes an accommodation of the blocking element by means of the closing element or in the closing element, respectively.

Preferably, the blocking element is arranged so as to be guided on the closing element, in particular in a pivotable manner with a pivoting about a pivot point, which is fixed relative to the closing element. The pivoting of the blocking element is triggered by means of the force of gravity and takes place relatively with reference to the arrangement of the closing element. Consequently, the blocking element can pivot on the closing element in such a manner that the closing element can be fixed in the closed state by means of the blocking element. The pivot point, which is fixed relative to the closing element, can be arranged within the body of the closing element or preferably outside of the closing element. The closing element is accommodated in a lifting axis in the valve so as to be movable, so that a movement of the closing element in the direction towards the lifting axis is possible between the closed state and the open state. The pivot point, about which the blocking element can carry out a pivoting, is preferably located on the lifting axis of the closing element. In particular, the pivot point of the pivoting of the blocking element faces away from the side of the closing element, which is arranged in the direction towards the valve seat and which interacts with it so as to form a seal.

It thereby turned out to be particularly advantageous when the blocking element is embodied in a cone-shaped manner. In particular, it is advantageous when the blocking element substantially encompasses the shape of a truncated cone. In any event, the blocking element can encompass a cone-shaped and in particular a truncated cone-shaped jacket surface.

For the functioning of the closing element, it can encompass a valve needle, which extends with a shank section through the blocking element. Advantageously, the closing element can be embodied in several parts and a part of the closing element is formed in particular by the valve needle. To accommodate the blocking element on the closing element, the blocking element can encompass a passage area, through which the valve needle extends with a shank section. The truncated cone-shaped blocking element is thus sleeve-shaped, wherein the jacket surface of the blocking element, but preferably also the inner surface of the blocking element, can be embodied in a cone-shaped manner or in a hollow cone-shaped manner, respectively.

As a further part, the closing element can encompass a guide plate comprising a ball socket, wherein the blocking element is preferably guided in the ball socket in a movable manner. In a further advantageous manner, the valve needle can encompass a guide head comprising a ball-shaped guide surface, wherein the blocking element is additionally guided on the ball-shaped guide surface, so as to form a counter bearing for guiding in the ball socket. By guiding the blocking element in the ball socket of the guide plate on the one hand and via the ball-shaped guide surface of the guide head of the valve needle on the other hand, a compulsory guide of the blocking element about the pivot point is created. In particular, the pivot point forms the center point of the virtual ball surface, which is simulated in sections by the ball socket in the guide plate. Also in sections, the ball-shaped guide surface in the guide head of the valve needle forms a ball surface section, wherein the ball also has a center point, which falls within the pivot point, but with a smaller radius. In the event that the force of gravity now acts in a direction, which differs from the lifting axis of the closing element, the blocking element can pivot about the pivot point so as to fix the closing element in the closed state.

In particular, the closing element can encompass an axis of symmetry and the blocking element can encompass an axis of symmetry, wherein the blocking element is in a center position in the open state and both axes of symmetry are at least approximately located within one another and draw an angle relative to one another in the closed state when the blocking element is guided out of the center position under the impact of the force of gravity. The change from the open state into the closed state is consequently only brought about when the valve is tilted relative to the effective direction of the force of gravity. The effective direction of the force of gravity thereby runs in the direction of the axis of symmetry of the closing element when it is to be in the open state. In the event that the position of the valve is tilted, the blocking element follows the effective direction of the force of gravity, due to its force of gravity, and the blocking element is deflected laterally, that is, perpendicular to the axis of symmetry of the closing element. On the side, which points in the direction towards the guide plate, the blocking element encompasses a convex surface section, so as to slide in the ball socket. On the side pointing in the direction towards the guide head, the blocking element further has a concave surface section, with which the blocking element can slide on the guide surface in the guide head of the valve needle. The double guide of the blocking element thus takes place via the ball socket on the one hand and via the ball-shaped guide surface on the other hand.

The valve can encompass a housing, in which the closing element and the blocking element are accommodated, wherein the fixing of the closing element in the closed state is carried out by fixing the blocking element against the housing in at least one bearing point. The bearing point in the housing the valve is on the inner side of the housing and the blocking element is fixed against the inner side of the housing in response to a sufficient deflection out of the center position in the bearing point. The bearing point can also be embodied as a line contact and the cone-shaped blocking element rests on the cylinder-shaped housing of the valve on the inner side. In the bearing point, the blocking element is thereby supported against an area of the housing of the valve on the upper side, and the unit consisting of valve needle, guide plate and the blocking element is fixed in such a manner that that the closing element fits in the valve seat so as to form a seal. As long as the deflection of the blocking element remains, the valve needle of the closing element cannot lift out of the valve seat. As a result, the valve remains closed and fuel cannot leave the tank in an unwanted manner.

The particular advantage, which is created when the blocking element bears in the bearing point on the inner side of the housing of the valve, is a defined closed position of the closing element in the valve seat, without a further deflection of the blocking element beyond the bearing point being possible. Through this, it is avoided that the blocking element can deform against the valve seat in force closure with the closing element due to a deflection of the blocking element, which is too high, as it is possible in the case of the solutions with a ball as blocking element according to the state of the art.

In particular, the closing element and the blocking element can form a unit with a height dimension in the direction of the axis of symmetry of the valve, said height dimension being larger in response to a deflection of the blocking element out of the center position due to the force of gravity than in response to the arrangement of the blocking element in the center position. This height dimension can thereby be calibrated to such an accurate extent that a deformation or jamming of the blocking element in the housing of the valve in the bearing point is avoided.

According to a further measure, which improves the invention, the blocking element can encompass a hollow cone, through which the shank section extends, so that the blocking element can be moved on the shank section by means of wobbling. In the event that the blocking element is in the deflected position, so that the axis of symmetry of the blocking element draws an angle with the axis of symmetry of the shank section, the cone-shaped jacket surface of the blocking element rests against a line on the inner side of the housing of the valve. The inner side of the housing of the valve encompasses a cylindrical shape and the shank section extends along an axis of symmetry centrically through the cylindrical housing. The blocking element can consequently encompass a hollow cone and the contact line between the surface of the hollow cone on the inner side in the blocking element and the contact line between the blocking element and the inner side of the housing of the valve can be embodied so as to run parallel. In particular, the dimensioning of the blocking element with the hollow cone on the inner side can be dimensioned in such a manner that the blocking element even bears only on the shank section and does not bear against the inner side of the housing in a line contact. However, the bearing point between the blocking element and the inner side of the housing of the valve can be maintained.

A particular advantage is created in that the guide plate is screwed onto the valve needle, so that the distance of the ball socket to the guide surface of the guide head of the valve needle can be adjusted via a screw adjustment of the guide plate on the valve needle. The screw adjustment can comprise a thread, in particular a fine pitch thread, and the guide plate is screwed onto the valve needle. Provision can thereby be made for securing means, so as to prevent an automatic adjustment of the screw situation of the guide plate on the valve needle. The guide plate is thereby screwed onto the valve needle to the extent that a substantially play-free guide of the blocking element is formed between the ball socket and the guide surface.

According to the instant invention, the tank can be provided for a hand-held motor device, wherein the valve is arranged on the tank in such a manner that the blocking element is located in the center position when the motor device is held in a neutral position and wherein the blocking element can leave the center position when the motor device leaves the neutral position.

BRIEF DESCRIPTION OF THE DRAWINGS

Further measures, which improve the invention, will be illustrated in more detail below together with the description of a preferred exemplary embodiment of the invention by means of the figures.

FIG. 1 shows the valve according to the invention for aerating and ventilating a tank in a neutral position, in which the closing element is arranged in an open state and FIG. 2 shows the valve according to FIG. 1, wherein the valve is pivoted out of the neutral position by 90°, so that the blocking element is arranged in a blocked position, in which the blocking element fixes the closing element in the closed state.

PREFERRED EMBODIMENT OF THE INVENTION

The same or similar embodiments, elements or features are provided with identical reference numerals in FIGS. 1 and 2. The description of FIGS. 1 and 2 will take place below in an overview.

To avoid repetitions, the following explanations with reference to the embodiments, features and advantages of the instant invention (unless otherwise specified), refer to all of the exemplary embodiments of a valve 100 according to the instant invention, which are illustrated in FIGS. 1 and 2.

FIGS. 1 and 2 illustrate a valve 100 for aerating and ventilating a tank. In FIG. 1, the valve is in a neutral position and in FIG. 2, the valve is tilted by 90° in clockwise direction relative to the neutral position.

The valve 100 has a closing element 10, which is embodied in a plurality of parts, and which substantially comprises a valve needle 13, which can be fixed against a valve seat 11 in a valve plate 24 of the valve 100 so as to form a seal. A ventilation channel 27 is introduced into the valve plate 24 and the ventilation channel 27 is closed when the tip of the valve needle 13 is placed against the valve seat 11 so as to form a seal. FIG. 1 shows the valve needle 13 in an open state, so that the tank can vent via the ventilation channel 27, whereas FIG. 2 shows the valve needle 13 in a closed state, so that the ventilation channel 27 is closed.

According to the invention, a blocking element 12 is accommodated by the closing element 10, wherein the blocking element 12 is embodied in the form of a truncated cone and the accommodation on the closing element 10 is designed in such a manner that the blocking element 12 can carry out a pivoting about a pivot point S, which is located on the lifting axis 26. The guide of the blocking element 12 on the closing element 10 is carried out via a guide plate 15, which encompasses a ball socket 16. The blocking element 12 is guided against the ball socket 16 so as to be pivotably movable, wherein a counter bearing is formed by means of a guide head 17, which encompasses a guide surface 18, which is located opposite the surface of the ball socket 16 in the guide plate 15. The connection between the guide plate 15 and the valve needle 13 comprises a screw adjustment 25, and the guide plate 15 can be adjusted on the valve needle 13. The adjustment of the guide plate 15 relative to the valve needle 13 takes place until the blocking element 12, which can be moved by means of the force of gravity, is guided so as to move as freely as possible.

In the neutral position of the valve 100 shown in FIG. 1, the axis of symmetry 20 of the blocking element 12 is located in the axis of symmetry 19 of the closing element 10. In the event that the valve 100 is tilted, as is illustrated in FIG. 2, the axes of symmetry 19 and 20 draw an angle relative to one another, because the blocking element 12 is guided out of the center position due to the effect of the force of gravity. Finally, the blocking element 12 reaches against a housing 21 of the valve 100 in a bearing point 22, whereby the unit of the closing element 10 and the blocking element 12 reaches a height dimension, which causes a closing seat of the valve needle 13 in the valve seat 11. The valve needle 13 can lift out of the valve seat again 11 so as to release the ventilation channel 27 in the valve plate 24 only when the valve 100 is pivoted back again in the direction towards the neutral position and when the blocking element 12 is consequently in the center position.

So as not to limit the wobbling movement of the blocking element 12 on the valve needle 13, the blocking element 12 has a hollow cone 23, through which the shank section 14 of the valve needle 13 extends and which is dimensioned such that no lateral force acts on the shank section 14.

In the event that the blocking element 12 is in the deflected position, the shank section 14 can rest on the inner side of the hollow cone 23 of the blocking element 12 without accommodating compressive forces.

Due to the blocking element force of gravity, the guide surfaces 17, 18 open the valve in response to the return into the normal position even when an inner tank pressure prevails and the tank is ventilated without pressure.

As a result, a valve 100 for aerating and ventilating a tank of a hand-held motor device is created, by means of which valve 100 the advantage is attained that an excessive deformation of a blocking element 12, which can be moved by means of the force of gravity, out of a center position is avoided. Once the blocking element 12 is fixed against the inner side of the housing 21 in the bearing point 22, the valve needle 13 can already be fixed completely in the valve seat 11 so as to form a seal. However, in response to moving the valve 100 back into the neutral position, a simple disengaging of the blocking element 12 from being fixed against the housing 21 can take place, and the valve 100 can switch back and forth between the closed state and the open state to be repeated as often as desired. The valve plate 24 can be embodied as a component of the housing of the tank, or the valve plate 24 and in particular the housing 21 are individual parts, which are inserted into the tank of the motor device at a suitable location. Preferably, the valve plate 24 and the housing 21 are made of a plastic material, wherein the blocking element 12, which can be moved by means of the force of gravity, preferably consists of a material having a high density, e.g. steel or a metal or plastic having a higher density than steel, so as to attain a sufficient impact of the force of gravity on the blocking element 12.

The embodiment of the invention is not limited to the preferred exemplary embodiment specified above. Instead, a number of alternatives is possible, which use the described solution even in the case of embodiments of a generally different nature. All of the features and/or advantages, which follow from the claims, the description or the drawings, including constructive details, spatial arrangements and method steps, can be essential to the invention, either alone as well as in the most versatile combinations. The blocking element, which can be moved by means of the force of gravity, can be embodied so as to be rotationally symmetrical about its axis of symmetry 20, wherein the blocking element 12 can also be formed from individual parts, which are embodied so as to be evenly distributed in a symmetric manner about the axis of symmetry 20. As an alternative to the embodiment of a valve needle 13, the closing element 10 can also encompass a plate seat, to which the closing element 10 can be fixed against the valve seat 11 so as to form a seal

\*\*\*

List of Reference Numerals
100 valve
10 closing element
11 valve seat
12 blocking element
13 valve needle
14 shank section
15 guide plate
16 ball socket
17 guide head
18 guide surface
19 axis of symmetry
20 axis of symmetry
21 housing
22 bearing point
23 hollow cone
24 valve plate
25 screw adjustment
26 lifting axis
27 ventilation channel
S pivot point

The invention claimed is:

1. A valve for aerating and ventilating a tank comprising a closing element, which fits against a valve seat so as to form a seal in a closed state and which is lifted out of the valve seat in an open state, wherein provision is made for a blocking element, which can be moved by means of a force of gravity, by means of which the closing element can be fixed at least in the closed state, wherein the blocking element is accommodated on the closing element so as to be movable, and the closing element encompasses a guide plate comprising a ball socket, wherein the blocking element is guided in the ball socket.

2. The valve according to claim 1, wherein the blocking element is guided on the closing element, in particular pivotable with a pivoting motion about a pivot point, which is fixed relative to the closing element.

3. The valve according to claim 1, wherein the blocking element is embodied in a cone-shaped manner.

4. The valve according to claim 1, wherein the closing element comprises a valve needle, which extends through the blocking element with a shank section.

5. The valve according to claim 1, wherein the closing element, in particular a valve needle, encompasses a guide head comprising a ball-shaped guide surface, wherein the blocking element is guided on the ball-shaped guide surface, so as to form a counter bearing for guiding in the ball socket.

6. The valve according to claim 1, wherein the closing element encompasses an axis of symmetry and the blocking element encompasses an axis of symmetry, wherein the blocking element is in a center position in the open state and both axes of symmetry are at least approximately located within one another and draw an angle relative to one another in the closed state when the blocking element is guided out of the center position under the impact of the force of gravity.

7. The valve according to claim 1, wherein the valve encompasses a housing, in which the closing element and the blocking element are accommodated, wherein the fixing of the closing element in the closed state is carried out by placing the blocking element against the housing in at least one bearing point.

8. The valve according to claim 1, wherein the closing element and the blocking element form a unit comprising a height dimension in a direction of an axis of symmetry, said height dimension being larger in response to a deflection of the blocking element out of a center position due to the force of gravity than said height dimension in response to the arrangement of the blocking element in the center position.

9. The valve according to claim 1, wherein the blocking element encompasses a hollow cone, through which a shank section extends, so that the blocking element can be moved on the shank section by means of wobbling.

10. The valve according to claim 5, wherein the guide plate is screwed onto a valve needle, so that a distance of the ball socket to a guide surface can be adjusted via a screw adjustment of the guide plate on the valve needle.

11. The valve according to claim 1, wherein the tank is provided for a hand-held motor device and that the valve is arranged on the tank in such a manner that the blocking element is in a center position when a motor device is held in a neutral position and wherein the blocking element can leave the center position when the motor device leaves the neutral position.

* * * * *